Aug. 26, 1952 L. E. MOREE 2,607,951
MEAT TENDERIZING MACHINE
Filed May 11, 1946 4 Sheets-Sheet 1
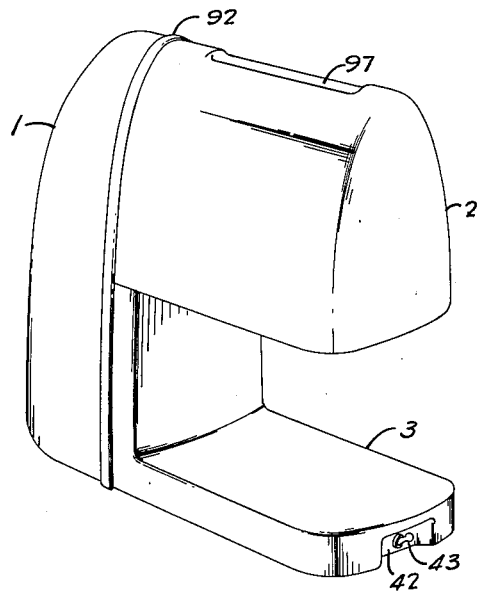
Fig. I
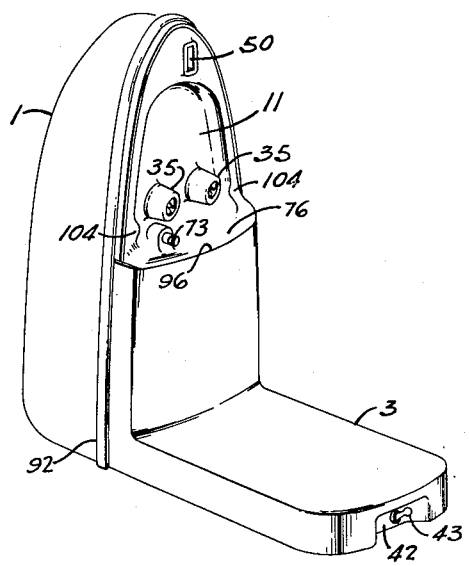
Fig. II
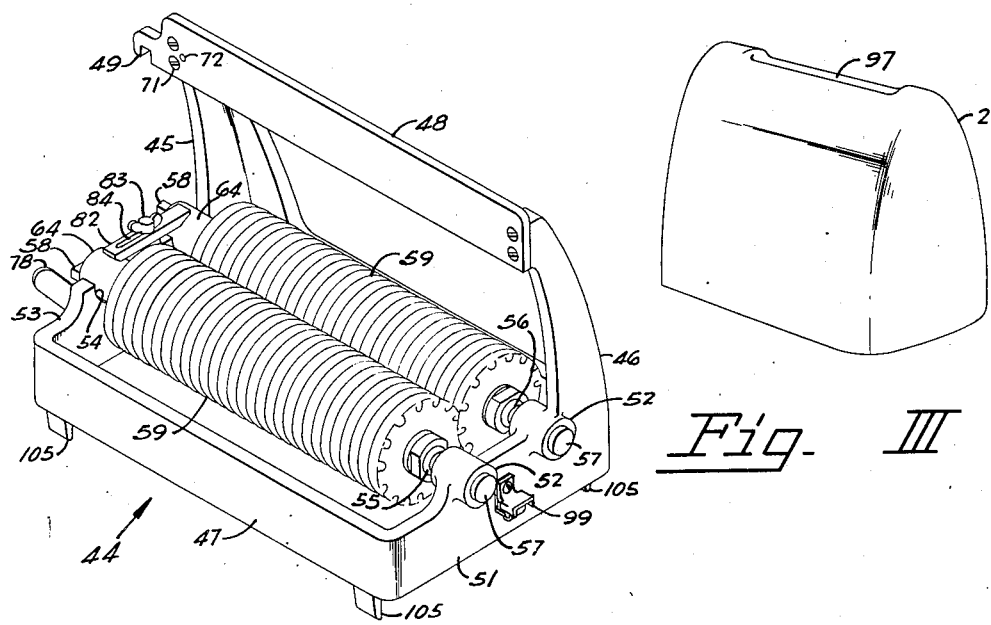
Fig. IV
Fig. III
INVENTORS
Leland E. Moree
BY
Marshall and Marshall
ATTORNEYS

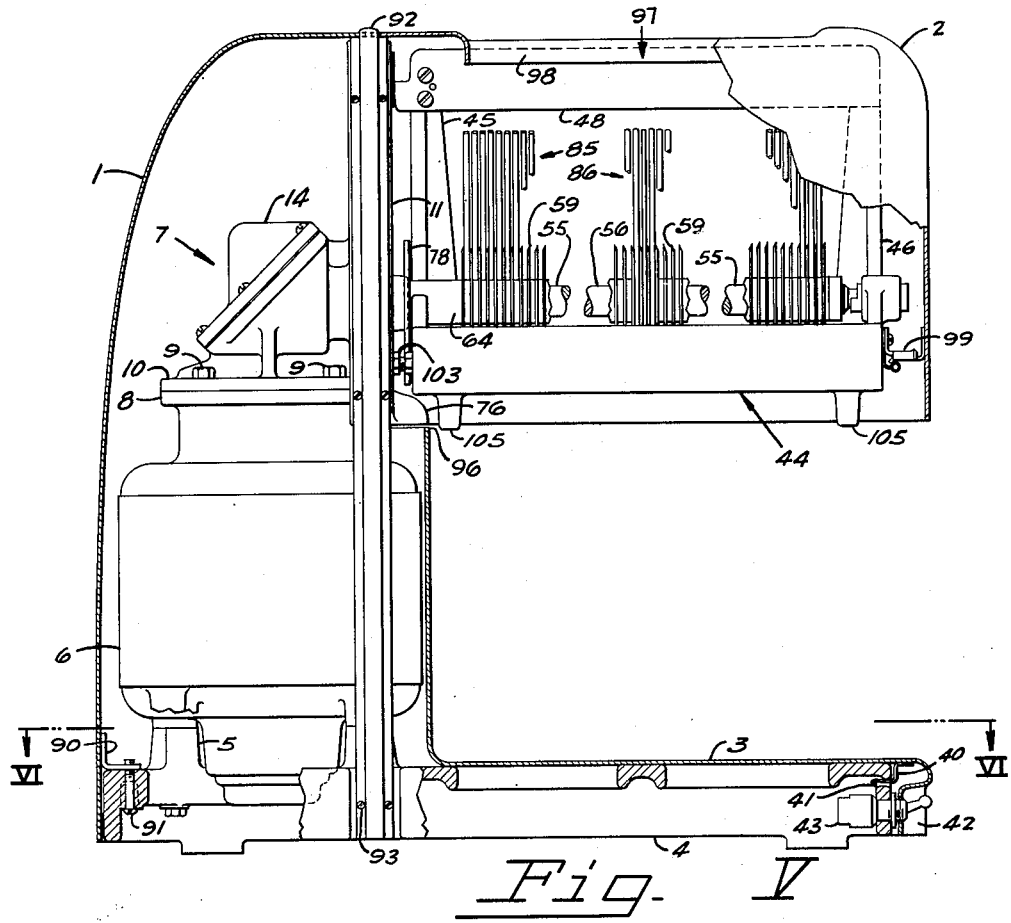
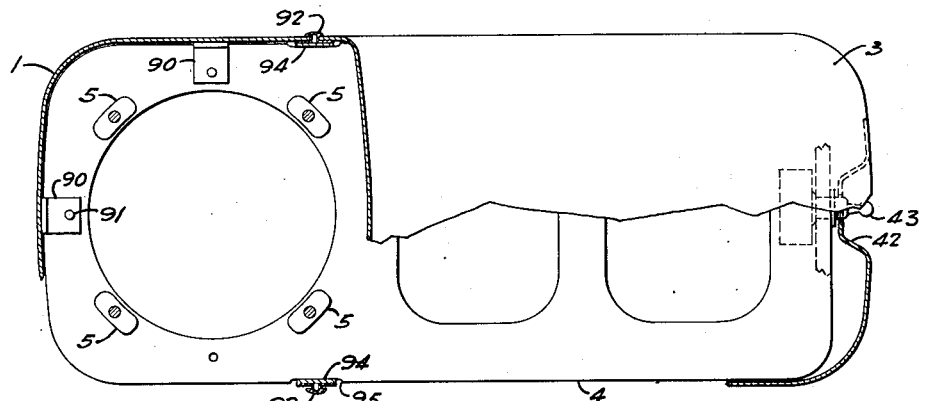

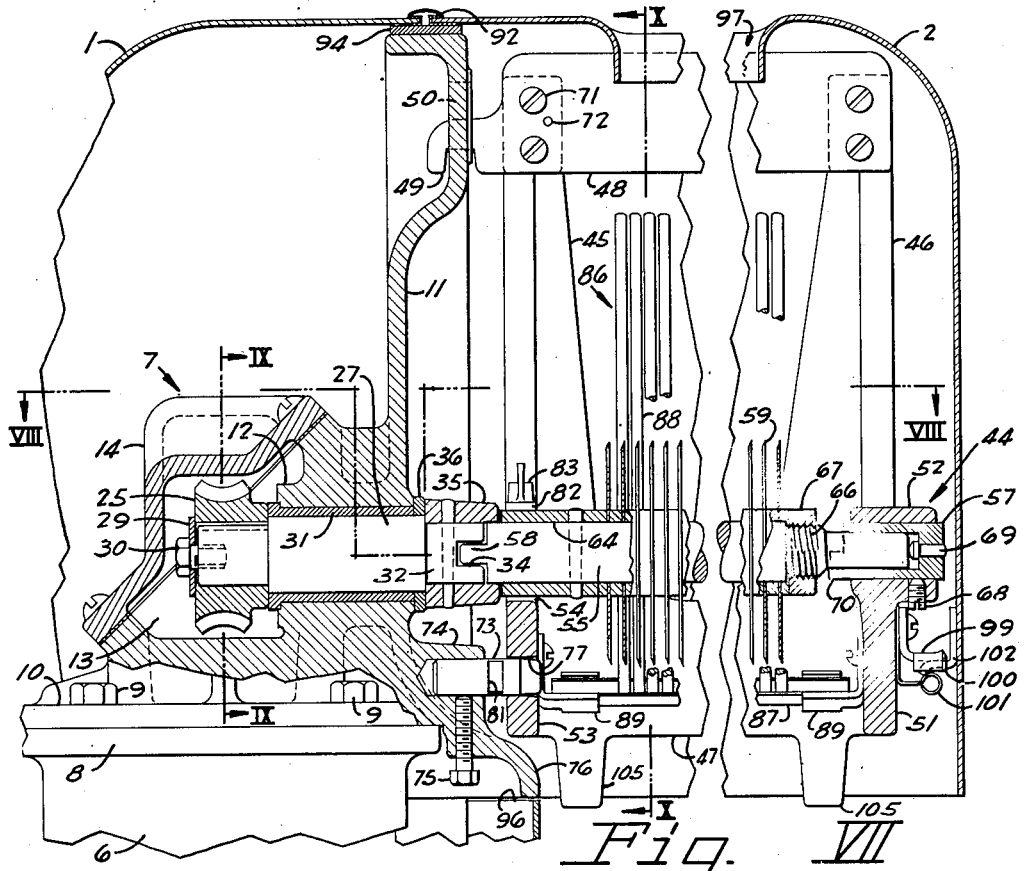
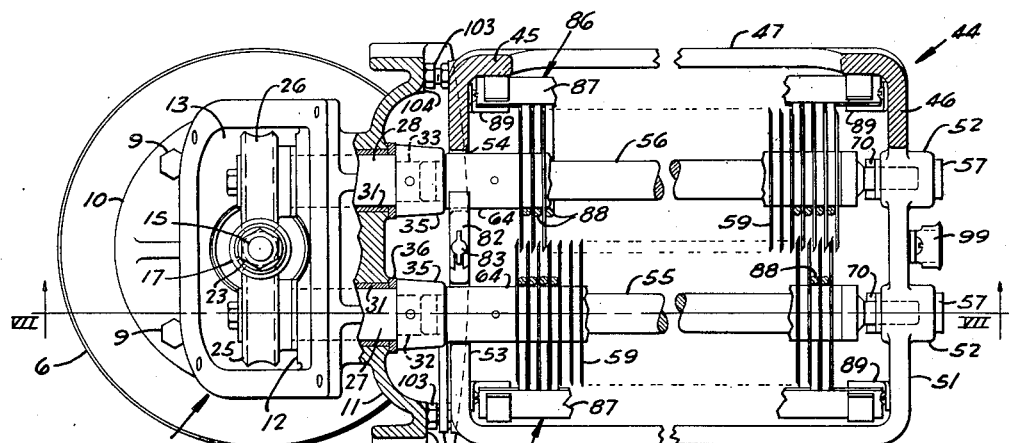

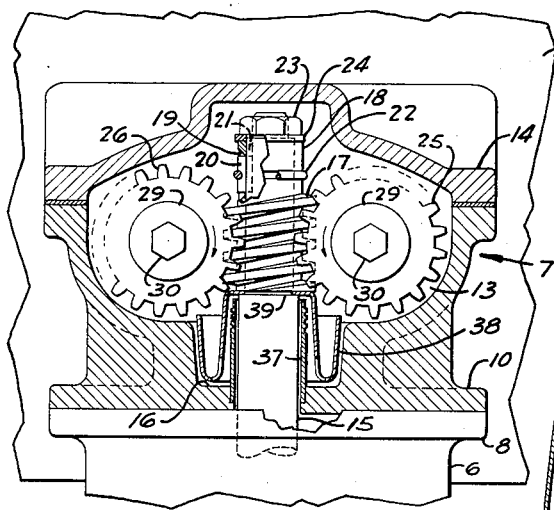

Patented Aug. 26, 1952

2,607,951

UNITED STATES PATENT OFFICE 2,607,951

MEAT TENDERIZING MACHINE

Leland E. Moree, Toledo, Ohio, assignor to Toledo Scale Company, Toledo, Ohio, a corporation of New Jersey Application May 11, 1946, Serial No. 669,119
In Canada September 7, 1946

6 Claims. (Cl. 17—26)

This invention relates to steak making machines of the type variously known as tenderizers or steak tenderers which are employed in retail meat markets and in other establishments for tenderizing boneless steaks and for knitting smaller fragments of meat together to prepare composite steaks.

In the history of the development of machines of this type it has been found that the most efficient are those which employ co-acting rolls between which the meat to be tenderized is passed. Each of these rolls is composed of a series of disk-like knives usually having slotted peripheries which form teeth in the edges of the knives.

It has long been known in the meat handling art that if those portions of meat handling machines which come into actual contact with the meat can be kept under refrigeration between periods when they are in actual use, the growth of mold spores and bacteria can be greatly inhibited and the machines maintained in a more nearly sterile condition. In prior art steak tenderizing machines it is relatively impracticable to try to keep the machines under refrigeration between periods of operation because they are too heavy to be carried in their entirety from the place where they are used to the refrigerator and stored therein. Furthermore, even if the prior art machines were carried to and fro and kept in the refrigerator when not in use, the results would be bad from another angle. Because the machines are not designed for rapid and safe disassembly not only the meat contacting portions of the machine would be kept under refrigeration but also those portions of the machine on which refrigeration would be unnecessary and undesirable.

The objectives of easy and thorough cleaning of the meat contacting portions of the machine, of simplified removal of sinews and tendons, of thorough scalding of the meat cutting knives under running hot water and of eliminating the necessity for grasping the extremely sharp knives with the hand have been the underlying objectives considered in the design of the machine embodying the present invention. These objectives have been achieved by the construction of a machine in which the entire meat contacting section of the machine is constructed as a single unit which easily can be detached from the remaining portion of the machine, (i. e. the base, motor and transmission) and is relatively light in weight. This construction permits those portions of the machine requiring refrigeration to be quickly removed from the machine and placed in a refrigerated space. This construction also permits the meat contacting portions of the machine, i. e. the knives and associated mechanism, to be washed directly by running hot water not only making it easier to clean the mechanism but also permitting it to be more thoroughly cleaned and scalded to render it sanitary. The present construction also provides means by which tendons and sinews tightly wrapped around the arbor can be severed and simply washed out from between the knives instead of having to be pulled from between the knives.

The principal object of the invention then might be said to be the provision of a steak tenderizing machine designed to facilitate not only the operation of the machine but also the maintenance of the machine in the most nearly sterile condition possible.

The provision of means for accomplishing the above-outlined objects, while fundamental in the design of a machine embodying the instant invention, has not required the sacrifice of any ease in the operation of the steak tenderizer, but on the contrary, has made possible more rapid and simple operation than was possible with the use of the relatively unhandy devices of the prior art.

A steak tenderizing machine embodying the instant invention and designed to accomplish the objectives set forth above also overcomes to a considerable extent the disadvantages inherent in the general layout of most prior art machines by providing an open throat into which the steaks emerge after having been treated by the knives so that the steaks can be grasped from the front or from either side of the machine. The provision of this open throat also eliminates the necessity for a steak deflecting plate with its inevitable lack of cleanliness. By the provision of the open throat the axes of the knife carrying arbors can extend at right angles to the front of the machine and thus the width of the machine can be decreased greatly since the axes of the knife bearing arbors extend rearwardly from the front of the machine rather than parallel to it. Thus, the space occupied by the machine on the counter can be reduced to as little as say seven or eight inches.

Meat tenderizing machines using co-acting rolls made up of disk-like cutting knives have to be equipped with some sort of guiding means that extend between adjacent knives in order to prevent the meat from being drawn onto and wrapped around the knife rolls. The means usually provided to prevent this from occurring is a guide formed of long flexible members extending between adjacent knives. The guides both guide the meat between the rolls onto the knives and peel it away from the knives after passage therebetween.

A further advantage arising from the open throat and general construction of a machine embodying the instant invention makes it possible to insert the meat guides from beneath the knife rolls and thus, if a tendon is caught by the knives, as described above, the steak cannot be pulled into the knife roll because the guide is between it and the rolls and the tendon either is snapped or is pulled completely out of the meat.

Further explanation of the advantages inherent in the design and construction of a machine embodying the instant invention will be included in the description of a preferred form of the invention which follows.

In the drawings:

Figure I is a perspective view of a steak tenderizing machine embodying the instant invention.

Figure II is a perspective view of the machine shown in Figure I but with the meat contacting portions of the machine removed.

Figure III is a perspective view of that portion of the machine which is removable and which contains as a unit the meat contacting and treating mechanism.

Figure IV is an isometric view on an enlarged scale of the meat contacting rolls and their carrying frame.

Figure V is an enlarged side elevation, with the housing and certain other parts being broken away, of the meat tenderizing machine shown in Figure I.

Figure VI is a horizontal sectional view, with parts broken away, taken substantially on the line VI—VI of Figure V.

Figure VII is a fragmentary vertical sectional view on an enlarged scale taken generally along the line VII—VII of Figure VIII, and showing the transmission and knife arbor bearings of the machine shown in Figure V.

Figure VIII is a reduced scale fragmentary view partly in section taken substantially on the line VIII—VIII of Figure VII.

Figure IX is a fragmentary vertical sectional view on an enlarged scale taken substantially on the line IX—IX of Figure VII.

Figure X is a reduced scale vertical sectional view taken substantially on the line X—X of Figure VII.

Figure XI is an enlarged fragmentary elevation of the upper portion of the machine as shown in Figure II.

Figure XII is a still further enlarged detail view, with parts shown in section, of latching means employed in the machine embodying the invention.

The machine which is illustrated in the figures above described has three main units. These units are the driving unit, the meat tenderizing unit and the machine base. These units each have a separate removable housing element which, in combination, form a continuous outer housing for the machine. The three housing elements are a motor housing 1, a knife roll canopy 2 and a receiving tray 3, the latter two elements being easily detachable from the machine for cleansing or other purposes. In the embodiment of the invention shown the housing 1 is shaped substantially like a semiparaboloid. The machine is assembled on a base casting 4 (see Figure VI) at one end of which are four upwardly extending pillars 5 on the upper ends of which a driving motor 6 is mounted. The pillars 5 are of such height that a standard motor, i. e. a 110—115 volt, 60 cycle motor, can be mounted thereon and will extend upwardly a sufficient distance so as to permit a gear housing 7 to be secured on its upper end and form the support for the knife roll canopy 2 and the mechanism contained therein.

On the upper end of the frame of the motor 6 there is formed a flat annular flange 8 to which is secured by means of bolts 9 a similar flange 10 formed on the gear housing 7 (see also Figures VII, VIII and IX). The gear housing 7 also has an upwardly extending arch-shaped wall 11 (Figure XI) in the lower portion of which a pair of bosses 12 are formed. The housing 7 is provided with a chamber 13 to contain lubricant and also the transmission members, which chamber is closed by a cover 14. The chamber 13 is so designed that it has an opening at an angle to the horizontal of approximately 45 degrees so that when the cover plate 14 is removed access to the chamber 13 is afforded either from the side or from the top.

A shaft 15 (Figure IX) of the motor 6 extends upwardly through the center of the flanges 8 and 10 and through the center of a cup 16 which is formed in the base of the housing 7. The upper end of the shaft 15 is turned to a diameter smaller than its main diameter and a worm 17 is mounted thereon. The worm 17 has a hub 18 on its upper end through which there is cut a slot 19. A short rectangular key 20 extends through the slot 19 and into a keyway 21 cut in the reduced diameter portion of the shaft 15. The key 20 is held in the slot 19 and keyway 21 by a split retaining ring 22. The worm 17 is retained on the shaft 15 by a nut 23 which is threaded on its uppermost end and bears down on a washer 24 interposed between the nut 21 and the end of the hub 18.

Two worm gears 25 and 26 are in mesh with the worm 17. The worm gears 25 and 26 are keyed on the ends of worm gear shafts 27 and 28, respectively, and are held on such shafts by washers 29 secured to the shafts by machine screws 30 which are threaded into the ends of the shafts 27 and 28. Each of the shafts 27 and 28 is journaled in a sleeve bearing 31 which is mounted in one of the bosses 12. The inner ends 32 and 33 of the shafts 27 and 28 extend through the bosses 12 and to the other side of the wall 11 opposite from the transmission gearing just described. A transverse slot 34 is cut in each of the ends 32 and 33 of the shafts 27 and 28 and a collar 35 is pinned on each of the ends 32 and 33. A washer 36 is located between each of the collars 35 and the end of its associated sleeve bearing 31.

In Figure IX there is shown oil retaining means which comprises a sleeve 37 and an oil slinger 38. The sleeve 37 surrounds the shaft 15 being forced and sealed in the flange 10 so that it extends above the edges of the cup 16 and prevents oil which collects in the cup 16 from running down the shaft 15 into the motor 6. This is the so-called "washing machine" construction. The oil slinger 38 is shaped like an inverted cup but has a flange bent backwardly and upwardly around its main cup-shaped body. It is secured to the shaft 15 by being pinched between the lower edge of the worm 17 and a shoulder 39 on the shaft 15 which exists where the small diameter portion of the shaft starts. Thus, when the shaft 15 rotates the oil slinger 38 rotates with it and, since both its inner and outer walls are cone-shaped, oil is carried away from the upper edge of the sleeve 37 downwardly into the cup 16 and thence is thrown up and out of the cup 16 onto the worm gears 25 and 26 to lubricate such gears and the worm 17.

The provision of an angular opening into the chamber 13 permits the shafts 27 and 28 to be inserted in their bearings and the worm gears 25 and 26 to be mounted thereon from a horizontal direction and also permits the worm 17 to be dropped vertically onto the shaft 15 with the upper end of the shaft 15 extending out of the chamber 13 when the cover 14 is removed so that the key 20 is accessible. The key 20 is a shear key and, in the event that the mechanism is jammed, it is sheared to prevent damage to the gearing. Since the upper end of the shaft 15 is accessible this shear key can easily be replaced by sliding the split ring 22 vertically and removing the sheared key for replacement with a new key.

Space is available above the gear housing 7 within the upper portion of the housing 1 for the mounting of a capacitor for the motor 6 if that type of motor is employed.

The receiving tray 3 is a unitary detachable structure which overlies the base 4 and extends vertically up around a portion of the periphery of the motor 6. It is secured on the base 4 by means of a resilient clip 40 (Figure V) which is engaged in a slot 41 formed in the front wall of the base 4. A recess 42 is formed in the front apron of the receiving tray 3 and a toggle switch 43 which is mounted in the front wall of the base casting 4 extends into the space formed by the recess 42. The toggle switch 43 controls the operation of the motor 6. This switch 43 is located in a recess so that it will not be closed accidentally and also so that it is accessible from the front of the machine.

The receiving tray 3 has been made easily detachable so that it can be placed in a sink for cleaning under a hot water faucet.

A unitary knife roll frame 44 (Figures IV, VII and VIII) consists of two upwardly extending curved arms 45 and 46 and an open rectangular frame 47. A tie bar 48 is secured to the upper ends of the arms 45 and 46. At the rear end of the bar 48 there is formed a hook 49 which is engageable in a square slot 50 (see also Figure II) which is formed in the arched upper portion of the wall 11. The hook 49 when engaged in the slot 50 supports the knife roll frame 44 on the machine.

The frame 47 has a front wall 51 in which are formed two bosses 52 and a rear wall 53 in which are formed a pair of semicircular grooves 54 so located as to be coaxial with the bosses 52. A pair of knife arbors 55 and 56 are journalled at their front ends in sleeve bearings 57 which are located in the bosses 52. The rear ends of the arbors 55 and 56 (see also Figure XIII) are formed with flat tenons 58 which are engageable in the slots 34 cut in the ends 32 and 33 of the shafts 27 and 28. When the tenons 58 are so engaged in the slots 34 the transmission earlier described rotates the arbors 55 and 56 toward each other (as shown by the arrows in Figure X).

As can be seen in Figure IV the two arbors 55 and 56 are parallel and are mounted in the knife roll frame 44 for support when that frame is removed from the machine. The position of the rear tenoned ends of the arbors 55 and 56 with respect to the slotted shafts 27 and 28 with which they cooperate is adjustable by loosening a pair of screws 71 which secure the tie bar 48 to the upper end of the arm 45. This is done with the hook 49 engaged in the slot 50 and the knife roll frame 44 in the position in which it occupies when assembled on the machine. After this adjustment has been made so that the tenons 58 engage freely in the respective slots 34, the screws 71 are tightened, a hole is drilled through the bar 48 into the arm 45 and the two members are secured to each other by a taper pin 72 driven therein.

The angular relationship between the knife roll frame 44 and the wall 11 from which it is hung and thus, with the rest of the machine, is adjusted and maintained by the following parts. A stud 73 is mounted in a boss 74 formed in the lowermost portion of the wall 11 and held therein by a set screw 75 which extends upwardly through a formed apron 76 on the lower portion of the wall 11. The forward end of the stud 73 extends into a hole 77 which is bored through the rear wall of the frame 47 to position the knife roll frame 44 and secure it against transverse movement. A latch 78 (Figure XII) is pivotally mounted on a screw 79 threaded in the rear side of the wall 53 and has an arcuate notch 80 cut in its edge. The latch 78 is flat and when in its upward or locked position extends into a slot 81 cut transversely in the stud 73. When the latch 78 is in its lower or unlatched position (as shown in the dotted lines in Figure XII) the arcuate notch 80 is in line with the stud 73 and the knife roll frame 44 can be removed from its assembled position (as shown in Figure VII).

When the arbors 55 and 56 are engaged in their respective drive shafts 27 and 28 a slight clearance exists between the sleeves 64 and the grooves 54 (see Figure XII) so that no friction is created by rubbing contact between the sleeves 64 and the end wall 53. However, when the latch 78 is unlatched and the knife roll frame removed from its assembled position (as shown in Figure IV) the weight of the arbors 55 and 56 causes them to drop this slight distance so that the sleeves 64 rest in the grooves 54. An arbor retaining latch 82 is pivoted by a thumb screw 83. The latch 82 has a longitudinal slot 84 through which the thumb screw 83 extends. The thumb screw is threaded into a boss on the top of the end wall 53 and is located between the grooves 54. The latch 82 serves to retain the arbors in the knife roll frame 44 when it is removed from the machine.

By loosening the screw 83, the latch 82 can be swung horizontally and slid rearwardly on the screw 83. This permits the knife rolls comprising the arbors 55 and 56 and their associated knives to be removed from the knife roll frame. This is accomplished by sliding the knife rolls longitudinally toward the end wall 53 until the opposite ends of the arbors 55 and 56 are withdrawn from their bearings 57 and are resting only on the lips 70. The knife rolls then can be lifted vertically out of the knife roll frame 44.

A pair of guide members 85 and 86 are provided to guide the steaks being treated between the knives 59 mounted on the two arbors 55 and 56 and to prevent these steaks from wrapping around the knife rolls. Each of the members 85 and 86 (shown most clearly in Figures VII and X) consists of a cross bar 87 in which are mounted a plurality of wires 88 that extend at right angles to the bar 87 and are so bent as to fit upwardly between adjacent ones of the knives 59 on the particular arbor with which the respective member 85 or 86 is associated. The cross bars 87 are each mounted in a pair of clips 89 which are secured to the inner surfaces of the end walls 51 and 53 of the knife roll frame 44.

By constructing the guides so they extend laterally to the sides of the frame 47, two objectives are achieved. This prevents pieces of meat from being dragged around the ends of the wires 88 and back onto the knives 59 if a long tough sinew becomes snagged on one of the teeth of one of the knives and also provides a guarding grid for the open bottom of the meat tenderizing unit to prevent anyone from accidently inserting his hand in back of the rotating knives 59. The wires 88 are resilient so that they will flex slightly against the pressure of the meat passing therebetween and are of circular cross section for two reasons; one, by rubbing against the knives 59 they keep the edges of the knives sharp; two, the circular cross section offers less resistance if one of the wires 88 is bent transversely and is struck by a tooth of one of the knives 59. When this occurs the circular cross section will tend to cam the wire out of the way and will not catch the tooth of the knife thus preventing damage either to the knife or the wire. The members 85 and 86 may be inserted from beneath the knife roll frame 44 when it is in its assembled position (as shown in Figure VII) or if preferred, they may be inserted when the frame 44 is out of the machine by rocking the frame backwardly onto its upwardly extending arms 45 and 46 to permit access to the under side of the knife rolls.

The motor housing 1 is mounted on the base 4 by means of three mounting brackets 90 (two of which are shown in Figure VI) which are permanently attached to the interior surface of the housing 1 and which are secured to the base 4 by screws 91. The curvature of the open front end of the motor housing 1 follows the same arch as does the periphery of the arch-shaped wall 11, which is constructed integrally with the casting forming the transmission housing 7. An extruded or otherwise formed beading 92 which has a substantially "H-shaped" cross section is secured at the sides of the base casting 4 by screws 93 (Figures V and VI). The molding 92 is supported in its arch around the forward edge of the housing 1 and over the periphery of the wall 11 by a flat strip 94 to which it is secured in some manner such as welding. The strip 94 braces the molding 92 and also braces the forward edge of the housing 1 where it does not overlie the periphery of the wall 11. A vertical notch 95 is formed in each side of the base casting 4 to accommodate the strip 94. The outer arm of the "H-shaped" beading 92 is curved and overlies the outer surface of the edge of the housing 1 to hide the metal edge and give a finished appearance to the exterior of the machine.

Similarly, the vertical edges of the upwardly extending portion of the receiving tray 3 are located between the other pair of arms of the H adjacent those into which the housing 1 extends and the beading 92 covers this edge also. As can be seen most clearly in Figure II, the horizontal upper edge 96 of the upwardly extending portion of the slice receiving tray 3 is curved to the same contour as that of the apron 76 formed at the lower portion of the wall 11 so that a substantially continuous surface is presented by the upper portion of the receiving tray 3 and the apron 76 of the wall 11 when the knife roll canopy 2 and its contents are removed from the machine. This permits the exposed mechanism to be wiped clean and prevents the accumulation of dirt at this junction point.

The detachable knife roll canopy 2 consists of a formed metallic sheet which has a longitudinally extending throat 97 formed in its ridge. The transverse shape of the canopy 2 (as can be seen by comprising Figures X and XI) is substantially the same as the shape of the arched periphery of the wall 11. The front end of the canopy 2 (Figure I) is substantially vertical with a slight horizontal curvature to match the curvature of the front apron of the receiving tray 3. The height of the canopy 2 is, of course, dependent upon the shape of the housing 1 and wall 11 but all these have been designed so that the distance from the throat 97 to the upper edges of the knives 59 is more than the length of the fingers of a man's hand in order to prevent anyone from being injured by inserting the fingers into the throat 97.

The canopy 2 is mounted on the knife roll frame 44 and is supported thereby. A portion of the canopy 2 immediately adjacent a lip 98 of the throat 97 rests on the tie bar 48 of the knife roll frame 44 and supports the canopy 2 over the knife roll frame. The rear open end of the knife roll canopy 2 extends between the same arms of the "H-shaped" beading 92 as does the rear edge of its slice receiving tray 3, again, therefore, presenting the same smooth contour on its exterior. The canopy 2 is held in place over the knife roll frame 44 by means of a latch comprising a formed bracket 99 (Figures IV, VII and VIII) which is attached to the front wall 51 of the frame 47 of the knife roll frame 44. This bracket has two downwardly depending arms 100 between which there is located a spring clip 101. A small clip 102 which may be spot welded on the interior of the canopy 2 snaps between the bracket 99 and the clip 101 when the canopy 2 is in place over the knife roll frame 44. The canopy 2 is removable from its assembled position over the knife roll frame 44 by being longitudinally slid (to the right in Figure VII) a sufficient distance to disengage the clip 102 from the spring clip 101 and to disengage the rear edge of the canopy 2 from the outer arm of the "H-shaped" beading 92. When the canopy 2 has been moved longitudinally a sufficient distance so as to disengage these parts (the lip 98 sliding along on the tie bar 48) it may then be lifted vertically free of the knife roll frame 44.

When it is desired to remove the meat tenderizing unit, comprising the knife roll frame 44, the knife rolls, and their canopy 2 from the rest of the machine so that this unit of the machine can be placed under refrigerated storage, or for other reasons, it is necessary only to disengage the stud 73 from its hole 77 and the hook 49 from its slot 50. In order to disengage these members the knife roll canopy 2 and frame 44 must be pivoted on the hook 49 in a counterclockwise direction (Figure VII) to withdraw the stud 73 from the hole 77 and the tenons 58 from their slots 34. If this swinging movement took place with the canopy 2 in its assembled position, it would crush the upper portion of the rear edge of the canopy 2 against the bead 92 in which it is inserted. Therefore, the latch 78 which must be swung to open position in order to free the frame 44 from the stud 73 is so placed that it cannot be swung into its open position until the canopy 2 has been moved longitudinally as explained above. As can be seen in Figure XII the latch 78 is prevented from being swung downwardly into its unlatched position by the wall of the canopy 2. However, when the canopy has been slid forwardly the arm of the latch 78 will clear the wall and it can be swung downwardly until it is stopped by a bolt 103 one of a pair of which are adjustably threaded into the end wall 53 near its ends (see also Figures VII and VIII). When the latch 78 has been unlatched the entire knife roll frame and housing can then be swung, as explained, in a counterwise direction to free the arbors from their drive shafts and as soon as they are disengaged can be bodily lifted and moved forwardly to disengage the hook 49 from the slot 50.

The bolts 103, which are located at opposite sides of the frame 47, serve as adjustable stops to position the frame 44 as a whole. In Figures VII and VIII, it can be seen that the head of each of the bolts 103 rests against one of a pair of pads 104 (see also Figure XI) to effect this positioning.

The horizontal frame 47 of the knife roll frame 44 is provided with four depending feet 105 which extend slightly below the lower edge of the canopy 2 (Figure X) and support the weight of the knife roll frame and its contents when it is removed from the machine and placed on a shelf or other independent support.

After the knife roll frame 44 and the canopy 2 have been removed from the machine, the canopy 2, as explained above, can be lifted vertically off the knife roll frame 44 exposing the knives 59 and the frame 44 for cleaning. After the canopy 2 has been removed from over the knife roll frame 44 the guides 85 and 86 are disengaged from their clips 89 and withdrawn from between the knives 59. Then the knife roll frame, still carrying the knife rolls, can be placed in a sink and hot running water can be turned onto the knives to wash away accumulated debris.

It thus becomes entirely unnecessary to handle the knife rolls directly since they can be carried to and from the machine in the knife roll frame 44, can be washed while in the frame 44 and even can be cleaned of sinews and tendons while in the frame 44. This is a highly advantageous feature since not only is all danger of cutting the hands eliminated, but also the edges of the knives are kept in better condition than if they were handled and bumped around in a pan or sink, which would bend the teeth and dull their edges.

Furthermore, the frame 44 itself also can be washed beneath a hot water faucet. It may be necessary to tin or otherwise protectively coat the frame 44 and its component parts in order to prevent oxidizing from the action of the water on the metal. Similarly the interior of the canopy 2 can be flushed clean if it is protectively coated.

The knife roll frame 44 is carried by the tie bar 48 from which it is suspended. Also, when the knife roll frame 44 and its canopy 2 are being moved between the counter where it is used and a refrigerator, for example, the entire assembly easily can be carried in one hand simply by inserting the fingers in the throat 97 and hooking them beneath the tie bar 48. This also is the way in which the knife roll frame 44 is held when detaching it from the remainder of the machine.

In reassembling the machine the guides 85 and 86 may be reinserted between the knives 59 before the knife roll canopy 2 is lowered over the knife roll frame 44 if desired. The knife roll canopy 2 is then lowered over the knife roll frame 44 in its outer or unlatched position and the tie bar 48 grasped through the throat 97. The entire assembly is then lifted, the hook 49 inserted through the slot 50 and the assembly swung downwardly until the ends of the tenons 58 either move into their respective slots 34 or abut the ends of the shafts 27 and 28. If the tenons are not in line with their respective slots the motor can be turned on with the weight of the knife roll frame and arbors holding the tenoned ends of the arbors 55 and 56 against the ends of the shafts 27 and 28 and, as each slot lines up with its respective tenon, this weight will pivot the entire knife roll assembly on the hook 49 and allow the tenons to drop into their slots one by one. The motor is then shut off. At the time the tenons 58 drop into their slots 34 the stud 73 also enters its positioning hole 77 and the latch 78 may be swung upwardly into its locked position thus securing the knife roll frame on the machine with the latch 78 up out of the way. The knife roll canopy 2 is then slid longitudinally into the locked position.

The embodiment of the invention which has been described may be modified to meet various requirements.

Having described my invention, I claim:

1. In a meat tenderizing machine, in combination, a housing, a generally vertical support wall forming at least the upper portion of one wall of the housing, a motor and drive means in the housing with a portion of the drive means extending through said support wall, an open generally rectangular frame, cooperating knife rolls supported in and extending from end to end of the frame, said frame having a rigid portion at one end that extends above the rolls, a readily releasable catch means comprising a first portion on an end of said rigid portion and a second portion near the top of said support wall in engagement with said first portion for holding the frame on the support wall with the rolls extending generally perpendicular to the support wall in operative engagement with the portions of said drive means projecting through the wall, and other interengaged releasable means on the wall and frame for preventing sliding of the frame on the support surface.

2. In a meat tenderizing machine according to claim 1, a second rigid portion extending above the rolls at the end opposite that portion having the portion of the catch means, and a member connecting the ends of said rigid portions to form a handle for the rectangular frame.

3. In a meat tenderizing machine according to claim 1, a canopy that is supported at least in part by and that encloses the frame and rolls, said canopy having an entrance throat for the reception of meat to be tenderized and an open bottom for the discharge of tenderized meat from the rolls.

4. In a meat tenderizing machine according to claim 1, manually operable lock means having a first member on the support wall and a second member on the frame, said members being engaged to prevent removal of said frame from the support surface.

5. In a meat tenderizing machine according to claim 1, a base that forms the bottom part of the housing and that extends laterally below and spaced from the rectangular frame when the latter is mounted on the support wall, and a tray that is supported on and that covers the laterally extending portion of the base.

6. In a meat tenderizing machine, in combination, a housing, a generally vertical support wall forming at least the upper portion of one wall of the housing, a motor and drive means in the housing with a portion of the drive means extending through said support wall, an open generally rectangular frame, cooperating knife rolls supported in and extending from end to end of the frame, said frame having a rigid portion including spaced parts located in a plane that is generally perpendicular to said knife rolls and that is located at an end of the frame, readily releasable catch means comprising a first portion on one of the spaced parts of said rigid portion and a second portion on said support wall in engagement with said first portion for holding the frame on the support wall with the rolls extending generally perpendicular to the support wall in operative engagement with the extending portions of said drive means, and other interengaged releasable means on the wall and frame for preventing sliding of the frame on the support surface.

LELAND E. MOREE.

REFERENCES CITED

The following references are of record in the file of this patent:

UNITED STATES PATENTS

| Number | Name | Date |
|---|---|---|
| 1,394,631 | Luschka et al. | Oct. 25, 1921 |
| 1,703,422 | Hedges | Feb. 26, 1929 |
| 1,893,699 | Dunning | Jan. 10, 1933 |
| 1,940,158 | Vancil | Dec. 19, 1933 |
| 1,982,487 | Swift | Nov. 27, 1934 |
| 2,007,464 | Wood | July 9, 1935 |
| 2,188,807 | Castricone | Jan. 30, 1940 |
| 2,290,812 | Norman | July 21, 1942 |
| 2,364,533 | Jackson | Dec. 5, 1944 |
| 2,399,153 | Wormeck et al. | Apr. 23, 1946 |
| 2,409,463 | Ahrndt | Oct. 15, 1946 |